(12) United States Patent
Farré Guiu et al.

(10) Patent No.: US 11,544,828 B2
(45) Date of Patent: Jan. 3, 2023

(54) AUTOMATIC OCCLUSION DETECTION

(71) Applicant: Disney Enterprises, Inc., Burbank, CA (US)

(72) Inventors: Miquel Angel Farré Guiu, Bern (CH); Marc Junyent Martin, Barcelona (ES); Pablo Pernias, Alicante (ES)

(73) Assignee: Disney Enterprises, Inc., Burbank, CA (US)

( * ) Notice: Subject to any disclaimer, the term of this patent is extended or adjusted under 35 U.S.C. 154(b) by 120 days.

(21) Appl. No.: 16/951,580

(22) Filed: Nov. 18, 2020

(65) Prior Publication Data
US 2022/0156900 A1 May 19, 2022

(51) Int. Cl.
| | |
|---|---|
| *G06T 5/00* | (2006.01) |
| *G06T 5/20* | (2006.01) |
| *G06T 5/50* | (2006.01) |
| *G06V 10/75* | (2022.01) |

(52) U.S. Cl.
CPC ............... *G06T 5/20* (2013.01); *G06T 5/002* (2013.01); *G06T 5/50* (2013.01); *G06V 10/751* (2022.01); *G06T 2207/20024* (2013.01); *G06T 2207/20084* (2013.01); *G06T 2207/20224* (2013.01)

(58) Field of Classification Search
CPC combination set(s) only.
See application file for complete search history.

(56) References Cited

U.S. PATENT DOCUMENTS

| | | | |
|---|---|---|---|
| 5,715,325 A | 2/1998 | Bang et al. | |
| 6,671,395 B1 | 12/2003 | Ott et al. | |
| 7,953,295 B2 | 5/2011 | Vincent et al. | |
| 8,144,979 B2 | 3/2012 | Kuo | |
| 8,218,831 B2 | 7/2012 | Tian et al. | |
| 8,265,349 B2 | 9/2012 | Wang et al. | |
| 8,311,329 B2 | 11/2012 | Meyer et al. | |
| 8,320,674 B2 | 11/2012 | Guillou et al. | |
| 8,526,732 B2 | 9/2013 | Galic et al. | |
| 8,626,236 B2 | 1/2014 | Lindner et al. | |
| 8,839,326 B2 | 9/2014 | Umeroglu et al. | |
| 8,917,275 B2 | 12/2014 | Grieves et al. | |
| 9,317,764 B2 | 4/2016 | Baheti et al. | |
| 9,412,030 B2 | 8/2016 | Bocharov et al. | |
| 9,465,774 B2 | 10/2016 | Maison | |
| 9,569,855 B2 | 2/2017 | Kim | |

(Continued)

OTHER PUBLICATIONS

J. Garain, et al., "On Foreground-Background Separation in Low Quality Document Images", International Journal of Document Analysis and Recognition (IJDAR), Feb. 10, 2006, 19 pages.

*Primary Examiner* — Jose L Couso
(74) *Attorney, Agent, or Firm* — Patterson + Sheridan, LLP

(57) ABSTRACT

A method includes producing a filter mask based on a blur mask and a saliency mask and identifying locations of a plurality of bounding boxes of a plurality of objects of interest in a received image. The method also includes applying the filter mask to the received image and to the locations of the plurality of bounding boxes in the received image to remove at least one object of interest from consideration. The method further includes performing a comparison of a location of a bounding box of the plurality of bounding boxes of an object of interest remaining in consideration to a predetermined safe region of the received image and generating a validation result based on the comparison.

20 Claims, 13 Drawing Sheets

(56) References Cited

U.S. PATENT DOCUMENTS

| | | | |
|---|---|---|---|
| 9,576,272 B2 | 2/2017 | Macciola et al. | |
| 9,792,675 B1 | 10/2017 | Lina et al. | |
| 10,354,122 B1 | 7/2019 | He et al. | |
| 10,460,196 B2 | 10/2019 | Dhawan et al. | |
| 10,691,984 B2 | 6/2020 | Loginov et al. | |
| 10,897,558 B1 * | 1/2021 | Sun | H04N 5/2226 |
| 2002/0159636 A1 | 10/2002 | Lienhart et al. | |
| 2012/0063681 A1 * | 3/2012 | San | H04N 9/43 |
| | | | 382/167 |
| 2015/0334398 A1 * | 11/2015 | Socek | G06T 7/254 |
| | | | 375/240.26 |
| 2018/0033152 A1 * | 2/2018 | Chen | G06V 20/52 |
| 2019/0057507 A1 * | 2/2019 | El-Khamy | G06V 20/70 |
| 2019/0156487 A1 * | 5/2019 | Liston | G06T 7/11 |
| 2019/0244327 A1 | 8/2019 | Lin et al. | |
| 2019/0304077 A1 * | 10/2019 | Wang | G06T 7/74 |
| 2019/0311202 A1 * | 10/2019 | Lee | G06K 9/627 |
| 2020/0143204 A1 | 5/2020 | Nakano et al. | |
| 2021/0150751 A1 * | 5/2021 | Liu | G06K 9/6201 |
| 2022/0044366 A1 * | 2/2022 | Zhang | G06T 5/004 |

* cited by examiner

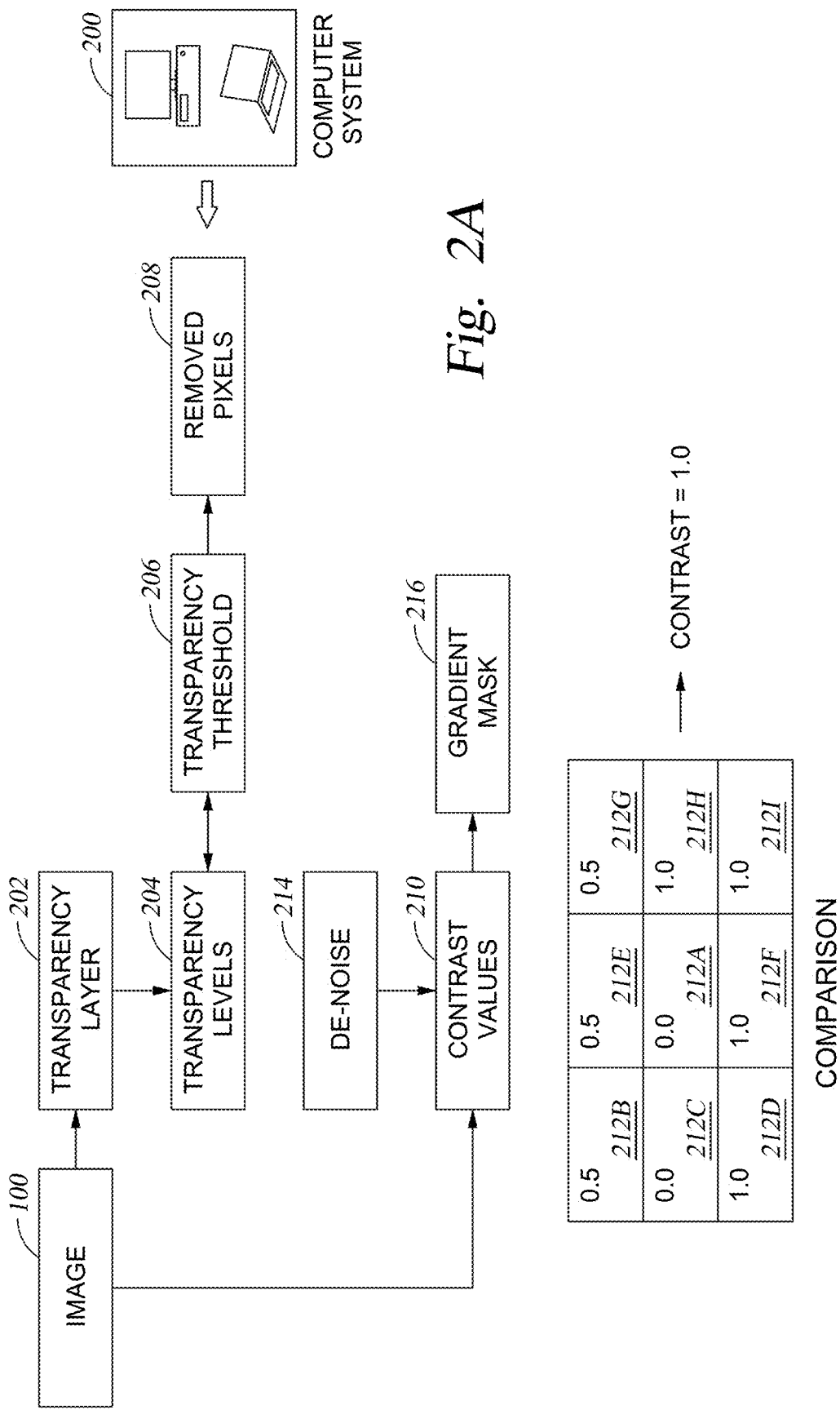

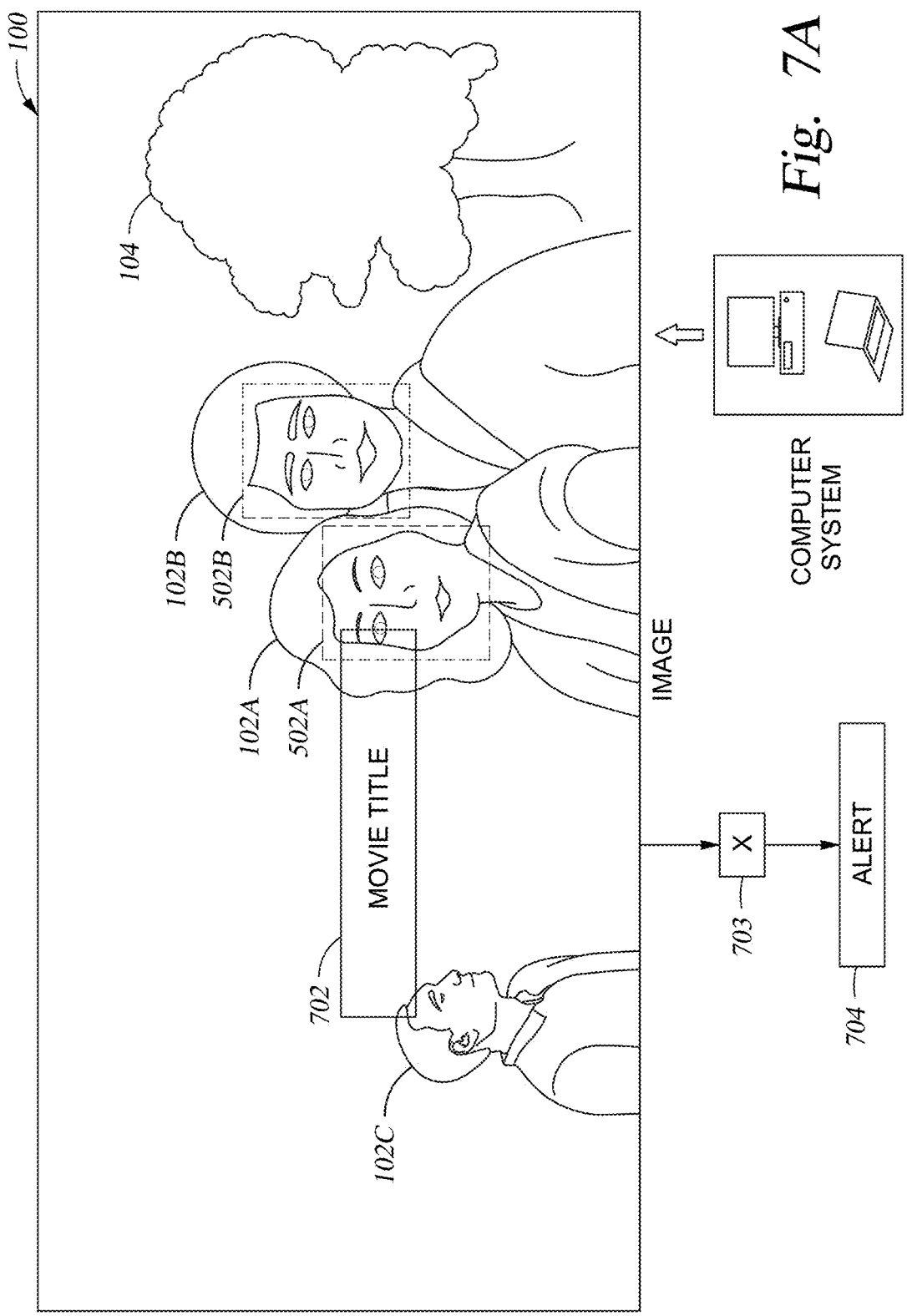

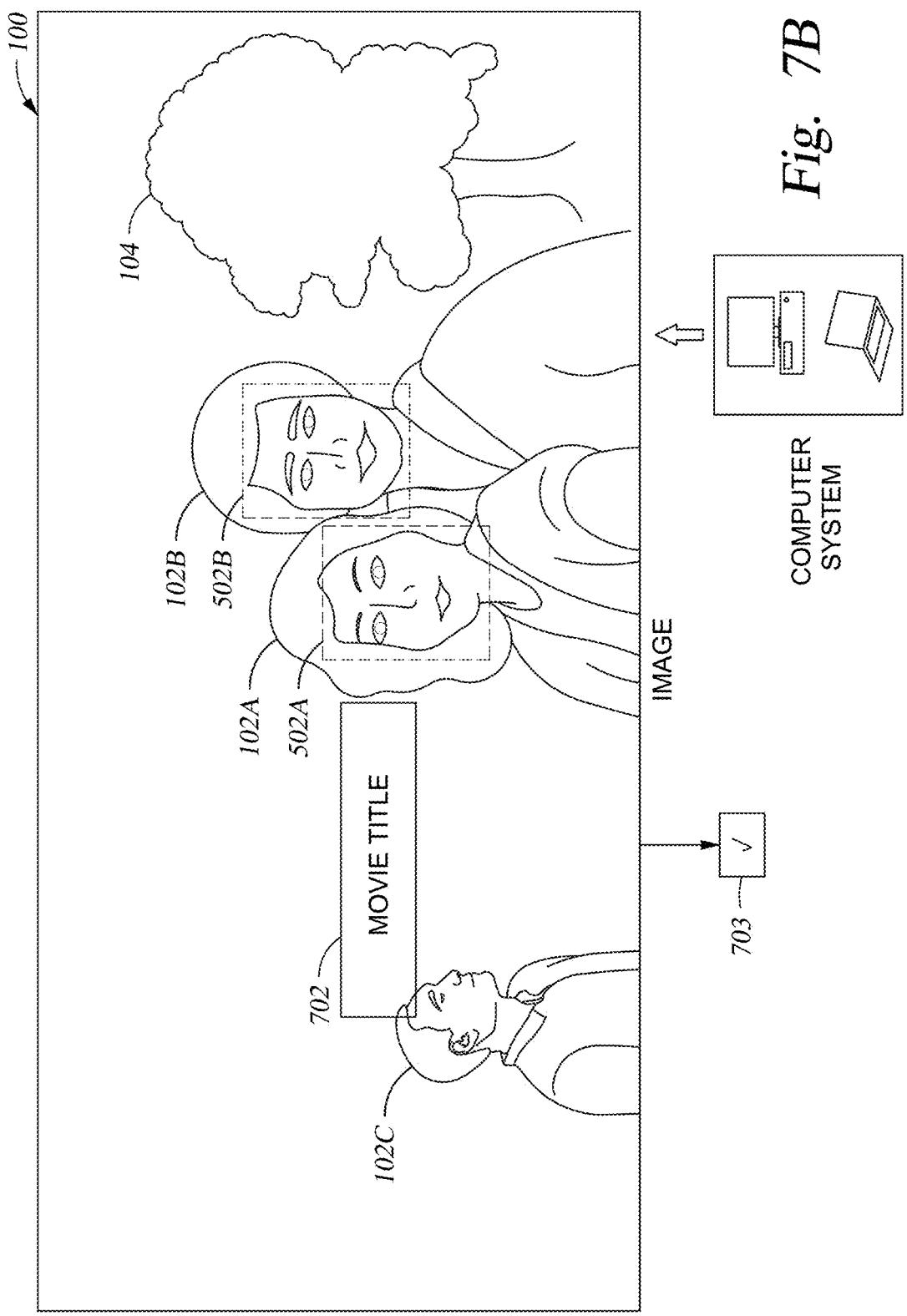

AUTOMATIC OCCLUSION DETECTION

BACKGROUND

Occlusion detection involves detecting whether objects in an image are occluded by other objects (e.g., objects in an overlaid image). In some instances, it may be acceptable for an object in the image to be occluded, and in other instances, it may be unacceptable. Discerning between these instances may rely on human judgment, leading to errors or inconsistent determinations and reasoning.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 2A illustrates an example generation of a gradient mask;

FIGS. 7A and 7B illustrate example occlusion detections;

DETAILED DESCRIPTION

Occlusion detection involves detecting whether objects in an image are occluded by other objects (e.g., objects in an overlaid image). In some instances, it may be acceptable for an object in the image to be occluded, and in other instances, it may be unacceptable. Discerning between these instances may rely on human judgment, leading to errors or inconsistent determinations and reasoning. For example, one reviewer may determine that an object in an image is important and should not be occluded, while another reviewer may determine that that same object is faded and may be occluded. As another example, another reviewer may determine that the object is not central to the theme of the image and may be occluded.

This disclosure describes processes to automatically detect object occlusion in an image. Generally, the processes involve generating and applying a number of masks to an image to determine regions of the image that should not be occluded. For example, the masks may assist in determining regions that have a high transparency, low contrast, high blurriness, or low saliency. The processes then detect objects within the image and determines whether the objects are within the determined regions. The objects that overlap with these regions should not be occluded. In this manner, the processes identify and locate objects within a region that should not be occluded. In particular embodiments, the processes adjust the image if one or more of these objects are occluded. The processes will be described in more detail with respect to FIGS. 1 through 9. A computer system (e.g., the computer system 200 described in FIG. 9) may perform any of the functions or actions described herein.

Figure 1:
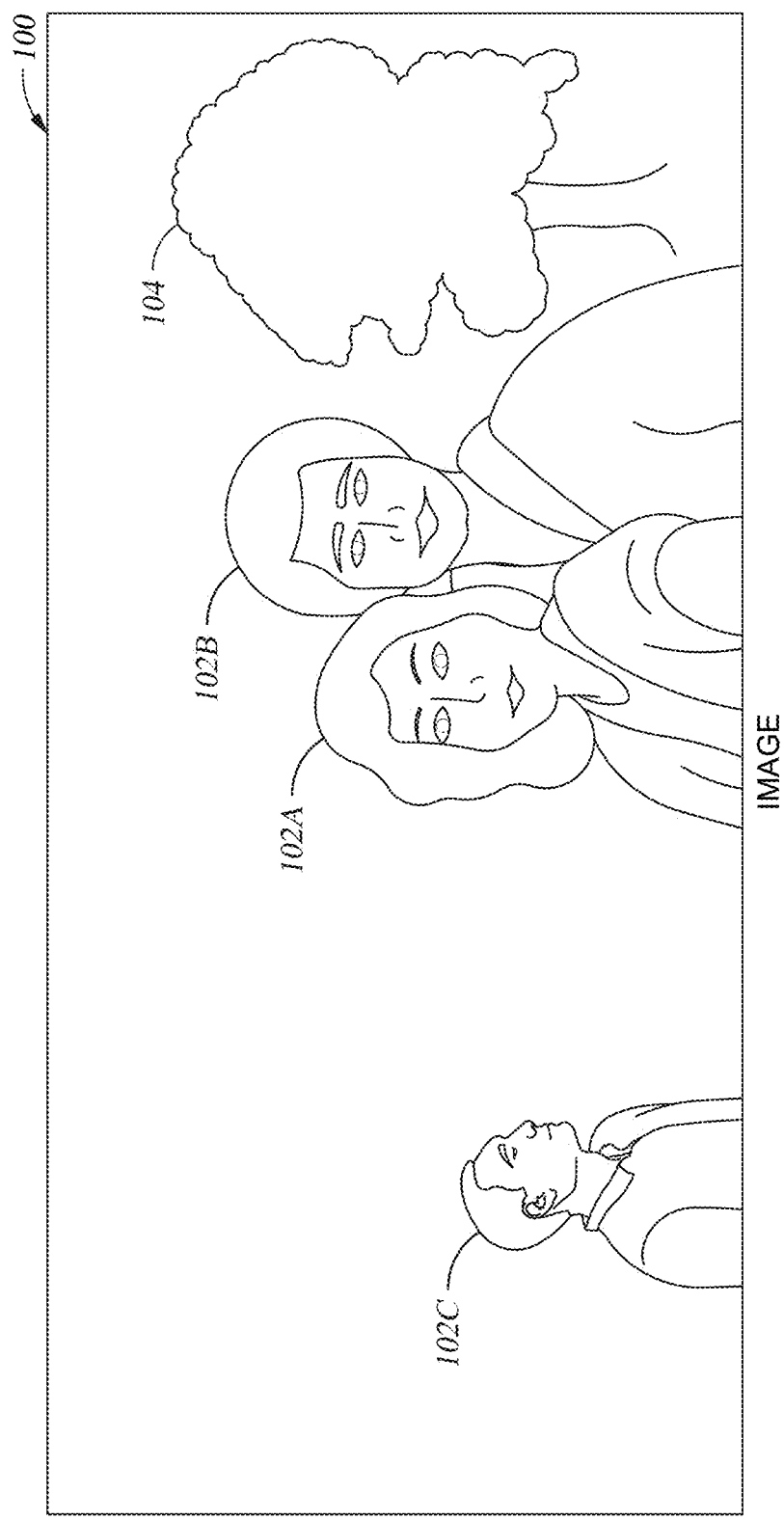
FIG. 1 illustrates an example image.

FIG. 1 illustrates an example image 100. As seen in FIG. 1, the image 100 includes one or more objects such as people 102A, 102B, and 102C and a tree 104. Some of these objects may be occluded when another object is overlaid onto the image 100. For example, if text or a title bar were overlaid onto the image 100, one or more of people 102A, 102B, and 102C and the tree 104 may be occluded. In some instances, it may be acceptable to occlude some of the objects in the image 100 but not others. The processes described herein analyze the image 100 to determine which objects within the image 100 may be occluded.

FIG. 2A illustrates an example generation of a gradient mask 216. Generally, a computer system 200 generates the gradient mask 216 by analyzing contrast values of pixels within the image 100. The gradient mask 216 may be used with one or more other masks to process the image 100.

The computer system 200 may include one or more computing devices, such as computers, laptops, servers, clients, tablets, or smartphones. Additional details of the computer system 200 are provided with respect to FIG. 9.

In particular embodiments, prior to processing the image 100 to generate any mask, the computer system 200 first removes certain pixels of the image 100 from further processing based on a transparency level of the pixel. As seen in FIG. 2A, the image 100 includes a transparency layer 202. The transparency layer 202 indicates the transparency levels 204 of the pixels within the image 100. Generally, the more transparent a pixel is, the higher its transparency level 204. The transparency levels 204 are compared against a transparency threshold 206 to identify the pixels with a transparency level 204 that exceeds the transparency threshold 206. As a result, the comparison identifies the pixels in the image 100 that are more transparent than indicated by the transparency threshold 206. These pixels 208 are then removed from further processing. No further occlusion analysis need be performed on the removed pixels 208 because of their high transparency level 204. Stated differently, because the removed pixels 208 are highly transparent, occlusion of these pixels 208 may be acceptable even if these pixels 208 form a part of an object in the image 100. In certain embodiments, by removing the pixels 208 from further consideration, the analysis of the image 100 is faster and consumes less computing resources. In certain embodiments, the process for identifying and removing the pixels 208 is not performed and all pixels of the image 100 are processed.

As discussed above, the image 100 is formed using pixels. The computer system 200 may have removed some of these pixels 208 using a pre-processing transparency level analysis discussed above. If the pixels 208 were removed from the image 100, then the remaining pixels are used to generate the gradient mask 216 (and the other masks described herein). If the pixels 208 are not identified or removed, then all the pixels in the image 100 are analyzed to form the gradient mask 216 (and the other masks described herein).

The computer system 200 determines contrast values 210 for the pixels in the image 100 or the remaining pixels in the image 100. In one embodiment, the contrast value 210 for a pixel is determined by comparing a color of that pixel in the image 100 with the colors of its surrounding pixels in the image 100. Each comparison generates a contrast value for the pixel and one of its neighboring pixels. The contrast value 210 that is assigned to the pixel is the maximum contrast value from the comparisons with the neighboring pixels. This disclosure contemplates that any suitable process for determining contrast values may be used (e.g., the Web Content Accessibility Guidelines process for determining contrast).

As an example, as seen in FIG. 2A, the computer system 200 compares a pixel in the image 100 with its surrounding pixels to generate the contrast values 212A, 212B, 212C, 212D, 212E, 212F, 212G, 212H and 212I. The contrast value 212A is 0 representing that there is no color difference when the pixel is compared with itself. The contrast value 212B is the contrast between the pixel and its top left neighbor. In the example of FIG. 2A, the contrast value 212B is 0.5. The contrast value 212C is the contrast between the pixel and its left neighbor. In the example of FIG. 2A, the contrast value 212C is 0. The contrast value 212D is the contrast between the pixel and its bottom left neighbor. In the example of FIG. 2A, the contrast value 212D is 1. The contrast value 212E is the contrast between the pixel and its top neighbor. In the example of FIG. 2A, the contrast value 212E is 0.5. The contrast value 212F is the contrast between the pixel and its bottom neighbor. In the example of FIG. 2A, the contrast value 212F is 1. The contrast value 212G is the contrast between the pixel and its top right neighbor. In the example of FIG. 2A, the contrast value 212G is 0.5. The contrast value 212H is the contrast between the pixel and its right neighbor. In the example of FIG. 2A, the contrast value 212H is 1. The contrast value 212I is the contrast between the pixel and its bottom right neighbor. In the example of FIG. 2A, the contrast value 212I is 1.

After the contrast values 212 for the pixel are determined, the computer system 200 assigns a contrast value 210 to the pixel. As discussed above, the maximum contrast value of the contrast values 212 for the pixel is assigned to the pixel as the contrast value 210. In the example of FIG. 2A, the contrast value 210 for the pixel is 1 because the maximum contrast value 212 for the pixel is 1.

This process for determining the contrast value 210 for a pixel is repeated until all the pixels of the image 100 remaining for analysis each have a contrast value 210 assigned. The contrast values 210 are then used to form the gradient mask 216. For example, the contrast values 210 may be arranged according to the positions of the pixels in the image 100. The gradient mask 216 is then generated based on the variance of the relative contrast in the contrast values 210. As a result, the gradient mask 216 shows the change or variance in contrast values 210 in different regions of the image 100.

In certain embodiments, the computer system 200 performs a de-noise process 214 on the contrast values 210 before the contrast values 210 are used to generate the gradient mask 216. The de-noise process 214 may remove noise within the determined contrast values 210. For example, the de-noise process 214 may perform a blur process on the contrast values 210 to smooth out any sharp or sudden changes in contrast values 210 in the corresponding positions of the image 100. As a result, the de-noise process 214 smooths the dataset of contrast values 210, which may result in a more accurate or useful gradient mask 216.

Figure 2B:
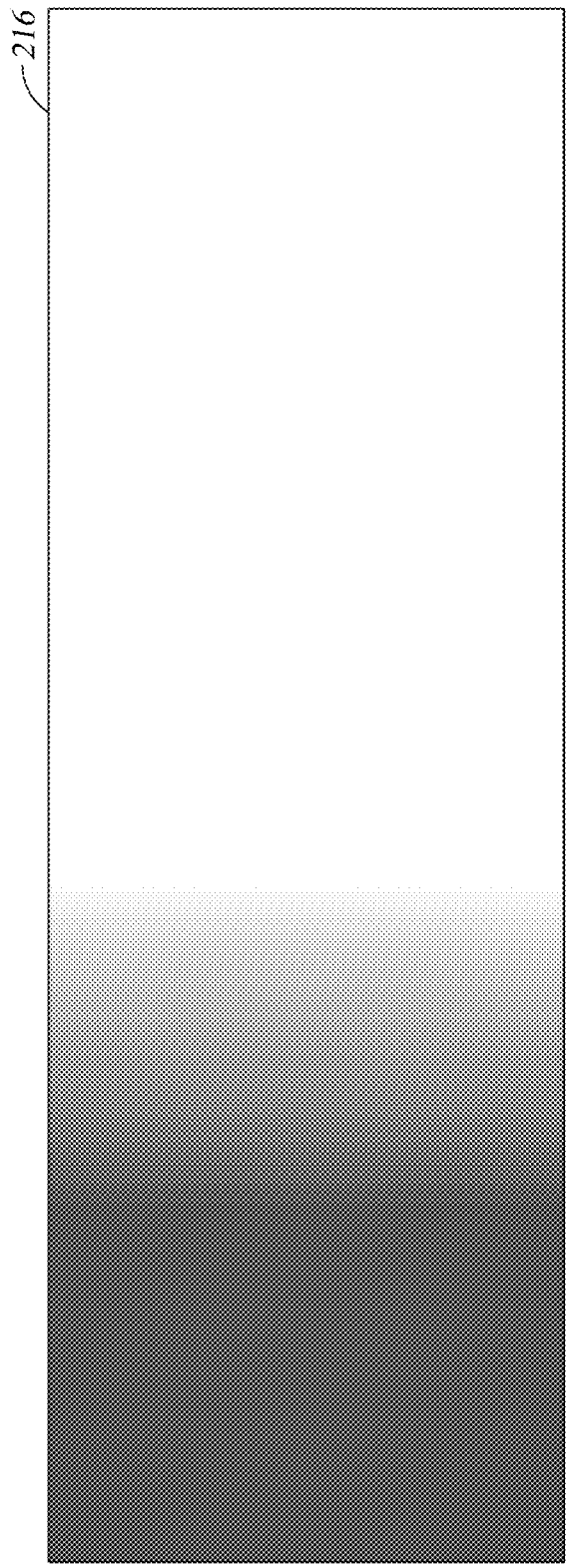
FIG. 2B illustrates an example gradient mask.

FIG. 2B illustrates an example gradient mask 216 corresponding to the image 100 in FIG. 1. As seen in FIG. 2B, the gradient mask 216 transitions from a darker shade on the left to a brighter shade on the right. The darker shaded regions on the left indicate areas of low contrast in the image 100. Generally, the darker the shading, the less contrast there is in that portion of the image 100. Thus, the example gradient mask 216 of FIG. 2B shows that the image 100 has the least contrast on the left side of the image 100 and the most contrast on the right side of the image 100. In certain embodiments, the gradient mask 216 indicates the regions of the image 100 where objects may be occluded. For example, objects appearing within the regions of low contrast in the image 100 may be occluded without much consequence, because those objects may already be difficult to see due to the low contrast within the region in which the object appears. On the other hand, objects within the high contrast regions of the image 100 should not be occluded, because those objects may be easily detected or seen due to the high contrast of the regions in which those objects appear. Although the gradient mask 216 is not generated or used in every embodiment, the gradient mask 216 may be helpful to identify regions of the image 100 that can be occluded due to their low contrast.

Figure 3A:
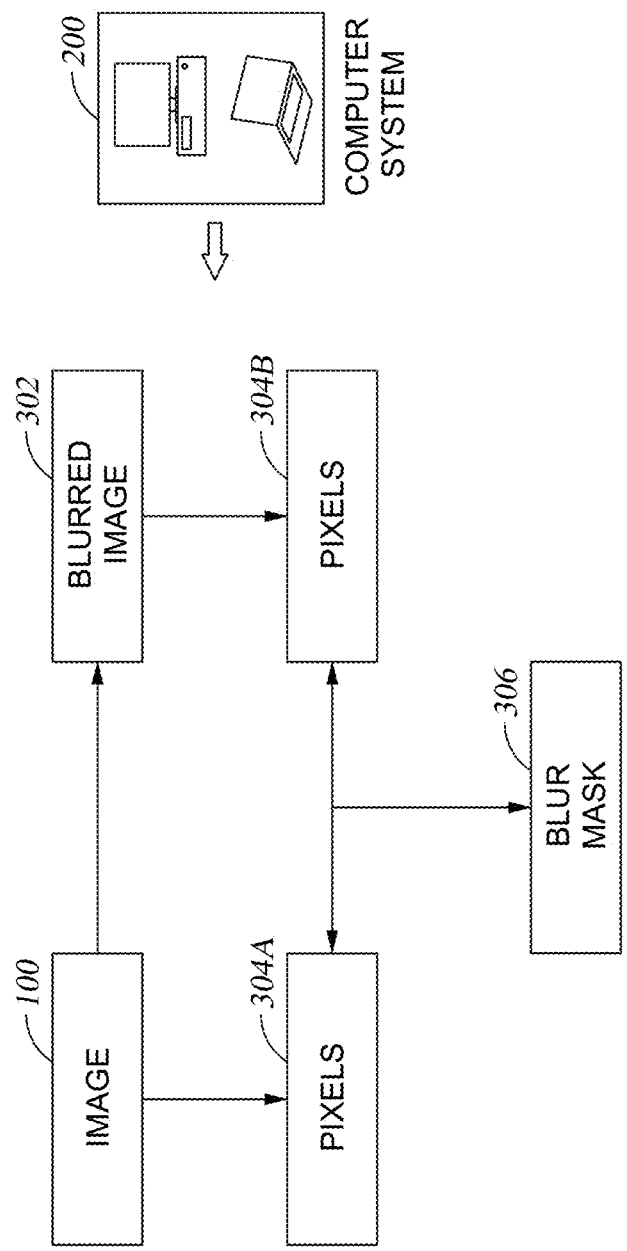
FIG. 3A illustrates an example generation of a blur mask.

FIG. 3 illustrates an example generation of a blur mask 306. Generally, the computer system 200 processes the pixels of the image 100 to generate the blur mask 306. The blur mask 306 indicates regions of the image 100 that are blurry. It may be more acceptable to occlude objects that appear in blurry regions of the image 100, because the blurry objects are more difficult to see than objects that appear in sharper regions of the image 100.

To generate the blur mask 306, the computer system 200 first blurs the image 100 to generate a blurred image 302. The blurred image 302 may be a blurry version of the image 100. The computer system 200 then compares the pixels 304A of the non-blurred image 100 with the corresponding pixels 304B in the blurred image 302. The differences between the pixels 304A and the pixels 304B are indicated in the blur mask 306. For example, if a pixel 304A is similar to a corresponding pixel 304B (e.g., the difference is small), then that may mean that the pixel 304A comes from a region of the image 100 that is already blurry. Stated differently, blurring that pixel 304A of the image 100 did not change that pixel 304A much, because that pixel 304A was already blurry. The computer system 200 may generate the blur mask 306 by arranging the differences between the pixels 304A and 304B according to the corresponding positions in the image 100. In this manner, the blur mask 306 indicates the regions of the image 100 that are blurry or sharp. Objects that appear in the blurry regions of the image 100 may be occluded, because these objects are blurry to begin with and may be less important or difficult to see. On the other hand, objects that appear in sharper regions of the image 100 may be important or easier to see and should not be occluded.

Figure 3B:
FIG. 3B illustrates an example blur mask.

FIG. 3B illustrates an example blur mask 306 corresponding to the image 100 in FIG. 1. As seen in FIG. 3B, the blur mask 306 includes darker regions and lighter regions. The darker regions correspond to blurrier regions of the image 100, whereas the lighter regions correspond to sharper regions of the image 100. Thus, objects that appear within the lighter regions of the blur mask 306 may be more important or more relevant, due to their sharper appearance in the image 100. As a result, these objects should not be occluded. On the other hand, objects that appear in the darker regions of the blur mask 306 may be occluded, because they appear blurrier in the image 100.

Figure 4A:
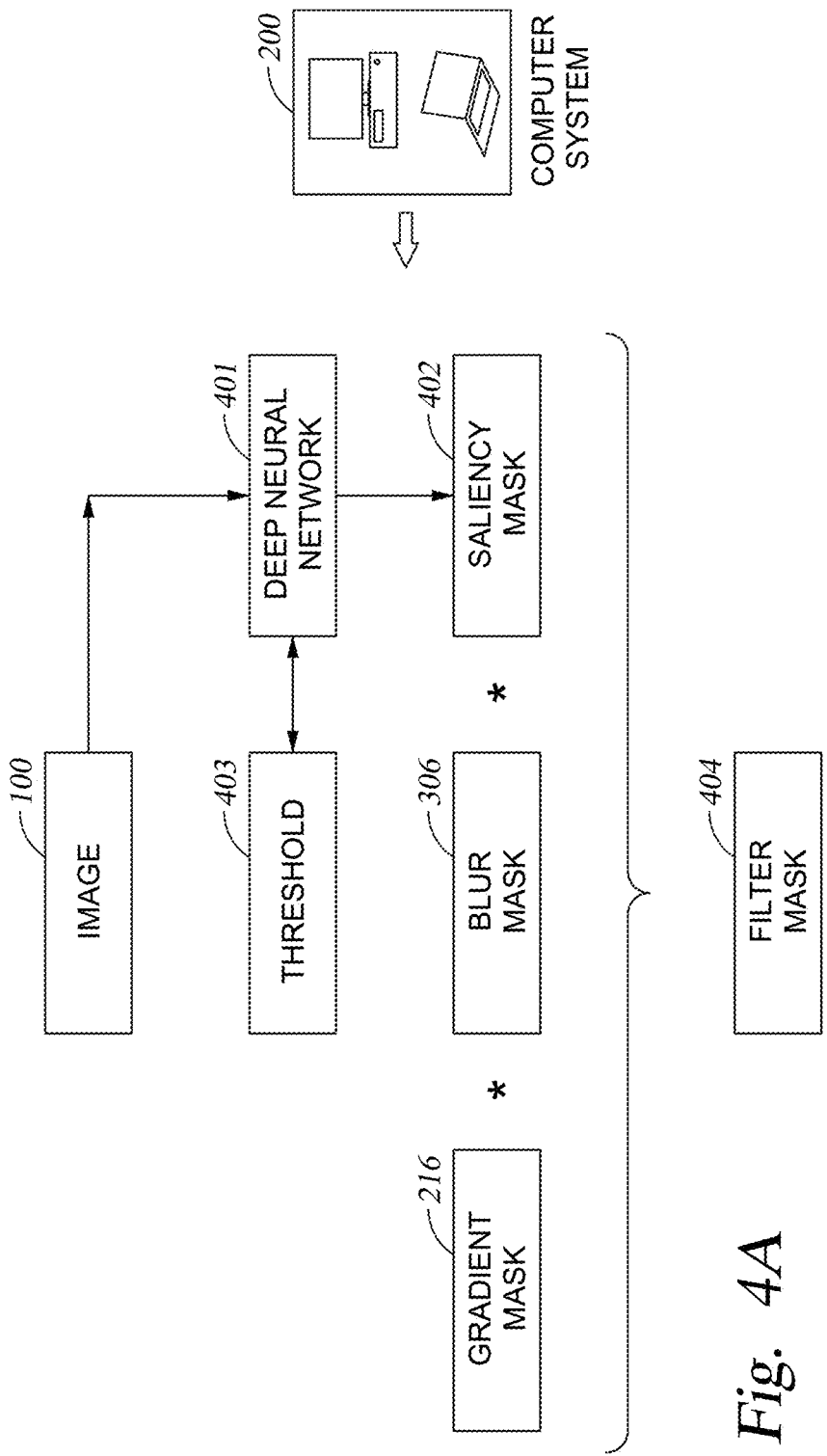
FIG. 4A illustrates an example generation of a filter mask.

FIG. 4A illustrates an example generation of a filter mask 404. Generally, the computer system 200 generates the filter mask 404 based on the gradient mask 216, the blur mask 306, and a saliency mask 402. The computer system 200 may apply the filter mask 404 to the image 100 to determine the objects in the image 100 that may or may not be occluded.

As discussed above, the gradient mask 216 indicates the regions of the image 100 with high contrast or low contrast. Objects that appear in regions of high contrast should not be occluded. On the other hand, objects that appear in regions of low contrast may be occluded, because the low contrast may make those objects more difficult to see.

In certain embodiments, the computer system 200 does not generate the gradient mask 216 or use the gradient mask 216 generate the filter mask 404. As a result, the computer system 200 conserves processing and memory resources (e.g., by not determining contrast values for pixels in the image 100) and generates the filter mask 404 in less time.

The blur mask 306 indicates the regions of the image 100 that are blurry or sharp. Objects that appear in the sharp regions of the image 100 should not be occluded. On the other hand, objects that appear in the blurrier regions of the image 100 may be occluded, because they may be more difficult to see.

The saliency mask 402 indicates the regions of the image 100 that are salient and attract the attention of a human viewer. A deep neural network 401 generates the saliency mask 402 processing the image 100. The deep neural network 401 may be trained using a saliency dataset, so that the deep neural network 401 can predict the regions of image 100 that are more or less salient. Stated differently, the deep neural network 401 is trained to predict the regions of the image 100 that are more likely to attract a human viewer's attention and the regions of the image 100 that are less likely to attract a human viewer's attention. In certain embodiments, the deep neural network 401 is trained to predict a length of time that a pixel or a region of the image 100 will hold a human viewer's attention. The deep neural network 401 then compares that predicted length of time with a threshold 403 period of time. If the predicted length of time exceeds the threshold 403, then the deep neural network 401 determines that the pixel or region of the image 100 is salient. If the predicted length of time does not exceed the threshold 403, then the deep neural network determines that the pixel or region of the image 100 is not salient. In some embodiments, the deep neural network 401 produces values that indicate the saliency of a pixel or region of the image 100. For example, the higher the value for a pixel or region, the more salient the pixel or region is. In certain embodiments, the computer system 200 implements the deep neural network 401.

The computer system 200 generates the filter mask 404 using at least the blur mask 306 and the saliency mask 402. For example, the filter mask 404 may be a product of the blur mask 306 and the saliency mask 402. By multiplying these masks together, the filter mask 404 indicates the regions of the image 100 that are sharp and likely to attract a human viewer's attention. Likewise, the filter mask 404 indicates the regions of the image 100 that are blurry or less likely to attract a human viewer's attention.

In certain embodiments, the computer system 200 also uses the gradient mask 216 to generate the filter mask 404. For example, the filter mask 404 may be a product of the gradient mask 216, the blur mask 306, and the saliency mask 402. By multiplying these masks together, the filter mask 404 indicates the regions of the image 100 that are higher contrast, sharp, and likely to attract a human viewer's attention. Likewise, the filter mask 404 indicates the regions of the image 100 that are low contrast, blurry, or less likely to attract a human viewer's attention.

Figure 4B:
FIG. 4B illustrates an example filter mask.

FIG. 4B illustrates an example filter mask 404. As seen in FIG. 4B, the filter mask 404 includes darker regions and lighter regions. The dark regions indicate the regions of the image 100 that are low contrast, blurry, or less likely to attract a human viewer's attention. The regions of the filter mask 404 that are lighter indicate the regions of the image 100 that are higher contrast, sharp, and likely to attract a human viewer's attention. In embodiments where the gradient mask 216 is not used, the regions of the filter mask 404 that are darker indicate the regions of the image 100 that are blurry or less likely to attract a human viewer's attention. The regions of the filter mask 404 that are lighter indicate the regions of the image 100 that are sharp and likely to attract a human viewer's attention. In the example of FIG. 4B, the right half of the filter mask 404 includes the lighter regions. Thus, objects that appear within these lighter regions should not be occluded. On the other hand, objects that appear on the left half of the image 100 may be occluded.

Figure 5:
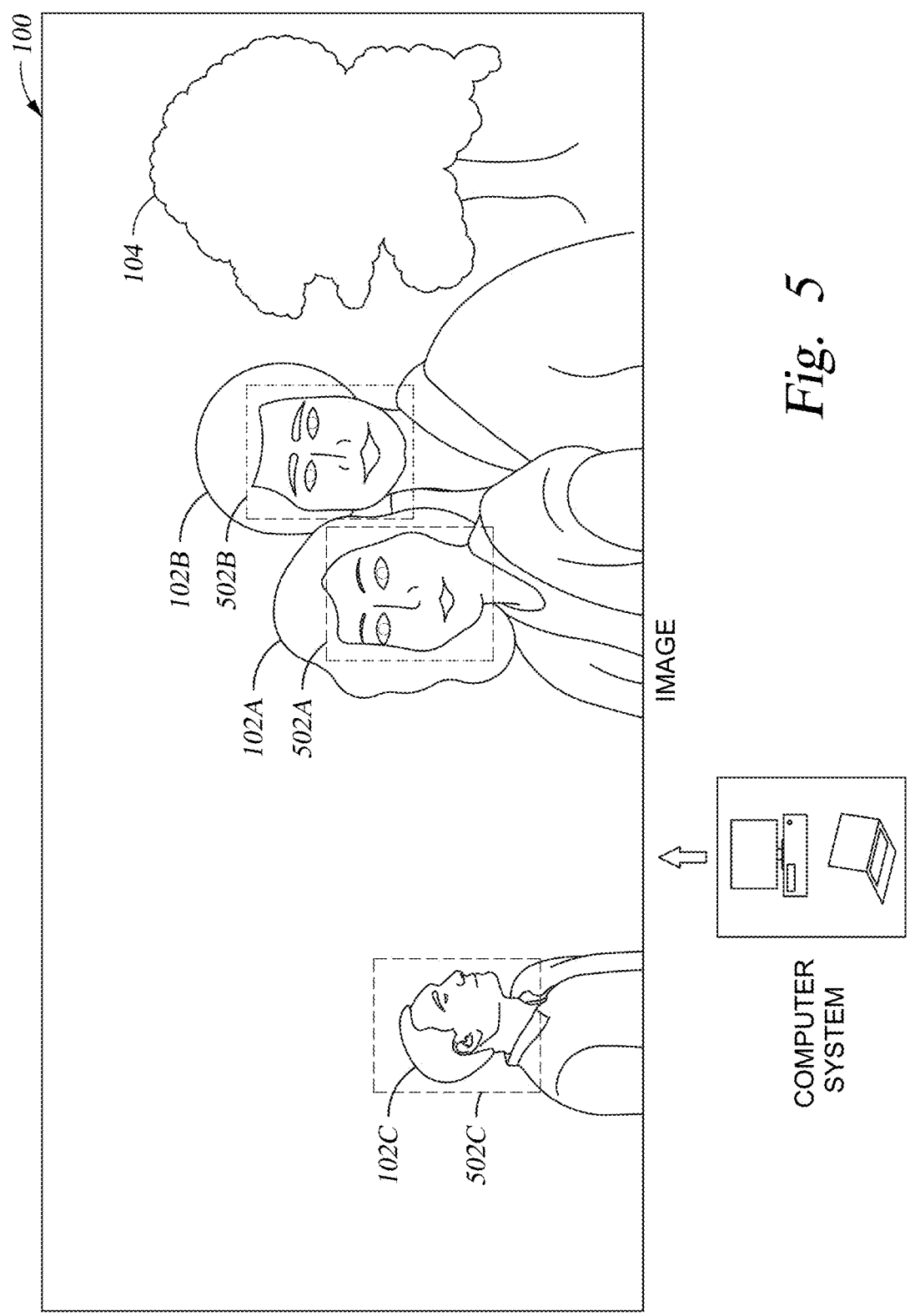
FIG. 5 illustrates an example object detection using the image of FIG. 1.

FIG. 5 illustrates an example object detection using the image 100 of FIG. 1. This disclosure contemplates the computer system 200 performing any suitable detection process on the image 100 to detect any suitable object within the image 100. In the example of FIG. 5, the image 100 is sent through a facial detection process that detects faces within the image 100. As another example, the image 100 may be sent through a tree detection process that would detect the tree 104 within the image 100.

In the example of FIG. 5, the computer system 200 detects the faces of the people 102A, 102B and 102C. The computer system 200 determines bounding boxes 502A, 502B and 502C for the faces of the people 102A, 102B and 102C. These bounding boxes 502A, 502B and 502C are then used to determine approximately which pixels correspond to detected objects of interest, which in this is example may be faces. It is noted that, although in this example, facial detection is used to illustrate an embodiment of the invention, in other embodiments, the objects of interest may be other types of objects, and other forms of classifiers or object recognition/detection algorithms may be used to generate bounding boxes around detected instances of said objects of interest in an image.

Figure 6:
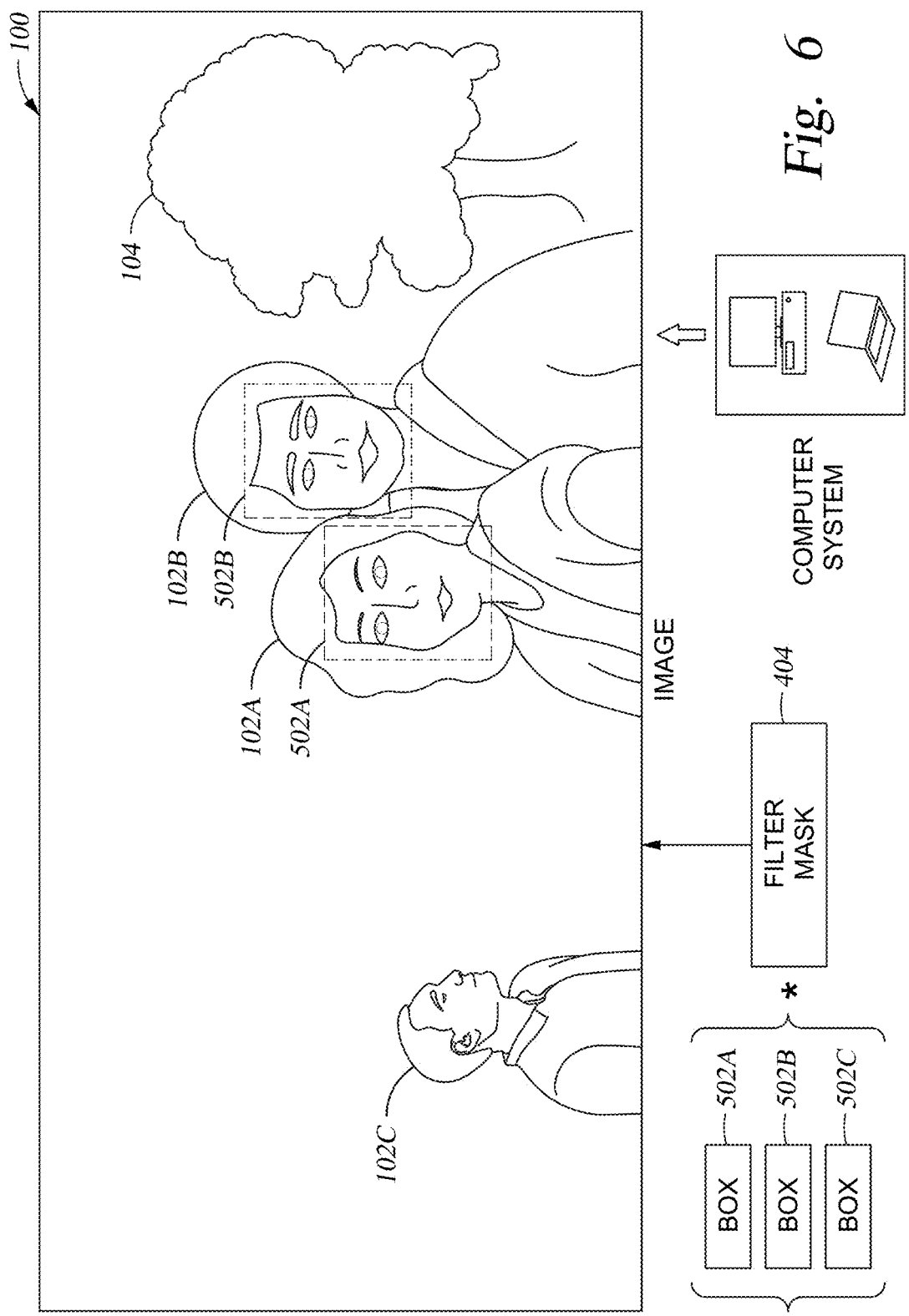
FIG. 6 illustrates an application of a filter mask to the example object detection of FIG. 5.

FIG. 6 illustrates an application of a filter mask 404 to the example object detection of FIG. 5. As seen in FIG. 6, the computer system 200 applies the filter mask 404 to the bounding boxes 502A, 502B and 502C detected in the example of FIG. 5. In certain embodiments, the bounding boxes 502A, 502B and 502C are multiplied with the filter mask 404 to determine which objects in the image 100 should or should not be occluded. Generally, if a bounding box 502 includes a pixel that falls within a lighter region of the filter mask 404, then that bounding box 502 is determined to be relevant. On the other hand, if a bounding box 502 includes only pixels that fall within a darker region of the filter mask 404, then that bounding box is determined to be irrelevant. Objects with relevant bounding boxes 502 should not be occluded. Objects with irrelevant bounding boxes 502 may be occluded. The computer system 200 may remove objects with irrelevant bounding boxes 502 from further consideration.

Applying the example filter mask of FIG. 4B to the bounding boxes 502A, 502B and 502C results in a determination that bounding boxes 502A and 502B are relevant and bounding box 502C is irrelevant. This determination may be made because the bounding boxes 502A and 502B contain pixels that fall within a lighter region of the filter mask 404 but the bounding box 502C includes only pixels that fall within the darker region of the filter mask 404. As a result, the bounding boxes 502A and 502B are considered relevant, and the faces of the people 102A and 102B should not be occluded. On the other hand, the bounding box 502C is determine to be irrelevant, and the face of the person 102C may be occluded. As a result, the computer system 200 removes the person 102C and the bounding box 502C from further consideration while the people 102A and 102B and the bounding boxes 502A and 502B remain in consideration.

The bounding box 502C has been removed from FIG. 6 to indicate that the bounding box 502C is irrelevant. The absence of the bounding box 502C in FIG. 6 (and any other subsequent figures) should not be interpreted as the bounding box 502C being actually removed or deleted.

FIGS. 7A and 7B illustrate an example occlusion detection. FIG. 7A illustrates an example where a relevant bounding box 502 is occluded, and FIG. 7B illustrates an example where relevant bounding boxes 502 are not occluded. Generally, the computer system 200 performs occlusion detection by determining whether a portion of a bounding box 502 (e.g., a pixel in the bounding box 502) overlaps with a portion of a predetermined safe region (e.g., a pixel in the safe region) of the image 100 (or vice versa). The safe region may be a region that includes an object (e.g., a logo or title) or any other portion of the image 100 in which any overlap results in an invalidated image. If there is overlap, then it may mean that the bounding box 502 occludes or is occluded by an object in the safe region. Any occlusion may make it more difficult to see an object within the bounding box 502 (e.g., a person's face).

In the example of FIG. 7A, the computer system 200 determines a safe region 702 that includes a movie title in the image 100. The movie title may be overlaid onto the image 100. The movie title or safe region 702 occludes part of the face of the person 102A and part of the face of the person 102C. As seen in FIG. 7A, the safe region 702 overlaps part of the bounding box 502A for the face of the person 102A. The computer system 200 may determine that the safe region 702 overlaps with the bounding box 502A (or vice versa), which was determined in the example of FIG. 6 to be a relevant bounding box. In response, the computer system 200 may determine that the placement of the movie title overlaps an object in the image 100 that should not be occluded. In response, the computer system 200 generates a validation result 703 that indicates the occlusion. The validation result 703 may include an alert 704. The alert 704 may be communicated to alert a creator of the image 100 that a relevant object is being occluded. In response, the creator of the image 100 may adjust the image 100 to remedy the occlusion, in particular embodiments.

FIG. 7B illustrates an example where the movie title does not occlude a relevant object in the image 100. As seen in FIG. 7B, the safe region 702 does not overlap with a portion of the bounding boxes 502A and 502B. As a result, the computer system 200 may determine that no relevant objects in the image 100 are being occluded by the movie title, and the validation result 703 may indicate that no occlusions were detected. As a result, the movie title may be overlaid in the location shown in FIG. 7B even though the safe region 702 still overlaps a portion of the face of the person 102C.

In certain embodiments, the computer system 200 automatically adjusts the image 100 or an object in the safe region 702 as part of generating the validation result 703 (e.g., in addition to generating the alert 704). In the example of FIG. 7B, the computer system 200 may automatically adjust the image 100 or the movie title after the computer system 200 determines that the movie title occludes a relevant object in the image 100. For example, the automatic adjustment may include shrinking the movie title so that the safe region 702 does not overlap with a portion of the bounding box 502A. As another example, the automatic adjustment may include shifting the position of the movie title such that the safe region 702 does not overlap with a portion of the bounding box 502A. In another embodiment, the automatic adjustment may include altering a location of the safe region 702 by resizing or moving an object in the safe region 702 (e.g., the movie title) so that the safe region 702 does not overlap with a portion of the bounding box 502A. This disclosure contemplates any suitable adjustment being made such that the safe region 702 does not overlap with a portion of the relevant bounding box 502. Additionally, this disclosure contemplates the computer system 200 analyzing any suitable object overlaid onto the image 100 to determine whether the overlaid object occludes a relevant object in the image 100.

Figure 8:
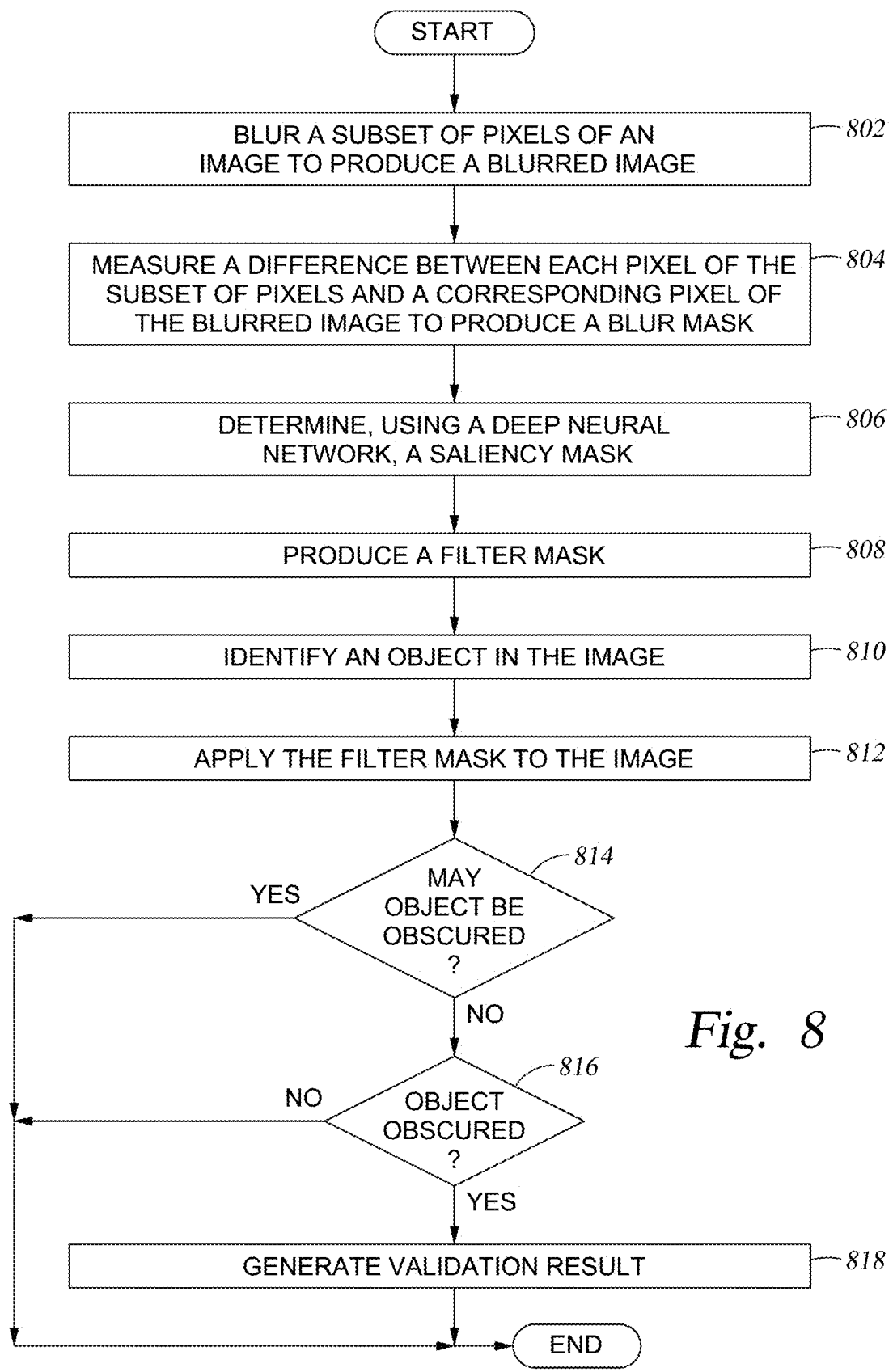
FIG. 8 is a flowchart of an example method of occlusion detection.

FIG. 8 is a flowchart of an example method 800 of occlusion detection. Generally, by performing method 800, it can be determined whether an object occludes a relevant object (or vice versa) in an image 100. The computer system 200 may perform the steps of method 800.

In step 802, the computer system 200 blurs a subset of pixels of an image 100 to produce a blurred image 302. In step 804, the computer system 200 measures a difference between each pixel 304A of the subset of pixels of the image 100 and a corresponding pixel 304B of the blurred image 302 to produce a blur mask 306. In certain embodiments, the blur mask 306 indicates the regions of the image 100 that are blurry. For example, a darker region of the blur mask 306 may correspond to a region of the image 100 that is blurry, whereas a lighter region of the blur mask 306 may correspond with a sharper region of the image 100. Objects that appear in a blurrier region of the image 100 may be occluded, while objects that appear in a sharper region of the image 100 should not be occluded.

In step 806, the computer system 200 uses a deep neural network 401 to determine a saliency mask 402. The deep neural network 401 may process the image 100 to predict the regions of the image 100 that are more or less likely to attract the attention of a human viewer. The deep neural network 401 may be trained using a saliency dataset so that the deep neural network 401 can analyze images to predict the saliency of different regions of images. The saliency mask 402 may indicate the regions of the image 100 that are predicted to hold human attention for a threshold period of time 403. The deep neural network 401 may predict these regions by processing the image 100. Objects that fall within these regions of the image 100 should not be occluded.

In step 808, the computer system 200 produces a filter mask 404 based on the blur mask 306 and the saliency mask 402. The filter mask 404 may be a product of the blur mask 306 and the saliency mask 402. As a result, the filter mask 404 indicates the regions of the image 100 that are both sharp and salient. Objects that fall within these regions should not be occluded. In certain embodiments, the filter mask 404 is further based on a gradient mask 216 that indicates regions of high or low contrast in the image 100. In these embodiments, the filter mask 404 is a product of the gradient mask 216, the blur mask 306, and the saliency mask 402 and indicates the regions of the image 100 that are high contrast, sharp, and salient. Objects that fall within these regions of the image 100 should not be occluded.

In step 810, the computer system 200 identifies an object in the image 100 using an object detection process. Any suitable object detection process may be used. For example, a facial detection process may be used to detect faces within the image 100. In certain embodiments, the object detection process determines a bounding box 502 for the determined object.

In step 812, the computer system 200 applies the filter mask 404 to the image 100 to determine the bounding boxes 502 that are relevant and irrelevant. For example, bounding boxes 502 that contain a pixel that is determined to be sharp and salient are determined to be relevant bounding boxes. In some embodiments that use the gradient mask 216, bounding boxes 502 that contain pixels that are determined to be high contrast, sharp, and salient are determined to be relevant bounding boxes 502.

In step 814, the computer system 200 determines whether an object should be occluded. For example, if an object has a relevant bounding box 502, then the object should not be occluded. If the object, however, has an irrelevant bounding box 502, then the object may be occluded. If the object may be occluded, then the occlusion detection process 800 ends.

If the object may not be occluded, then the computer system 200 continues to step 816, to determine whether the object is occluded. For example, the computer system 200 may determine whether a safe region 702 containing an object (e.g., logo or title) overlaps with the object. The computer system 200 may determine whether the safe region 702 overlaps part of the bounding box 502 for the object. If the safe region 702 does not overlap with part of the bounding box 502, then the method 800 concludes. If the safe region 702 overlaps part of the bounding box 502, then the computer system 200 proceeds to step 818 to generate a validation result 703, which may include an alert 704. The alert 704 may indicate that the occlusion has been detected. Additionally, the alert 704 may indicate the regions of the image 100 that have been improperly occluded. In certain embodiments, the validation result 703 includes an automatic adjustment. The computer system 200 may make the automatic adjustment to remedy the occlusion. For example, the computer system 200 may automatically adjust a size or position of the object in the safe region 702 so that the safe region 702 no longer overlaps with the bounding box 502.

Figure 9:
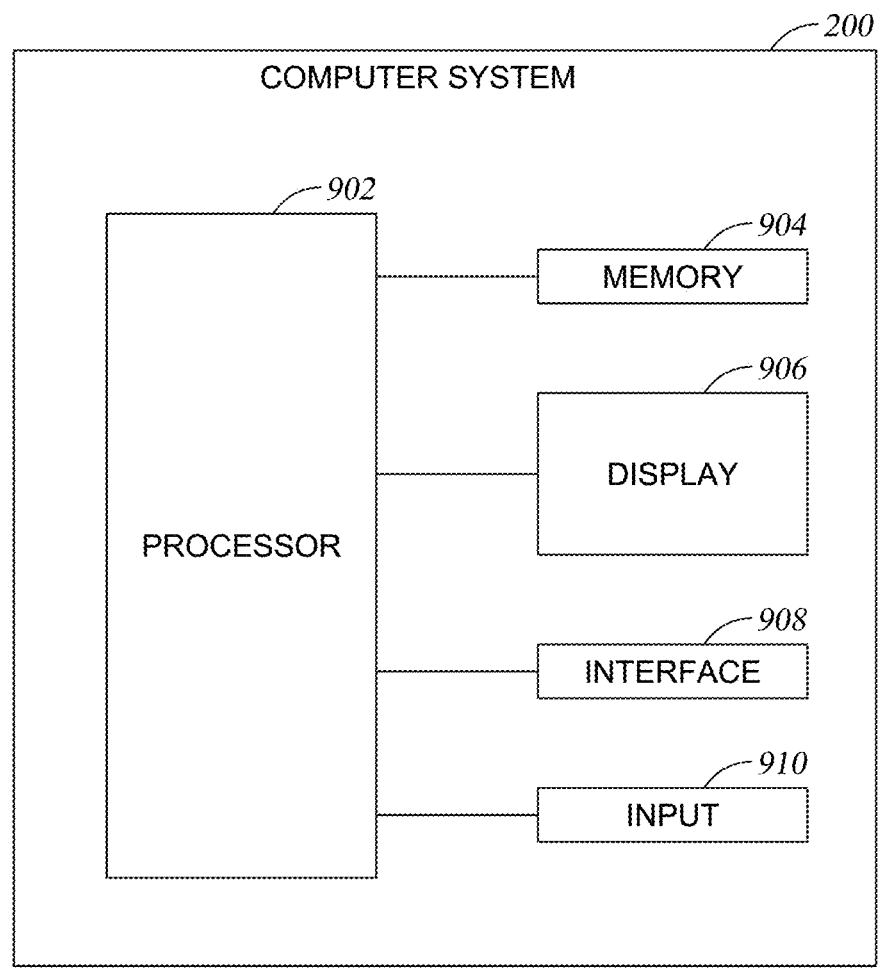
FIG. 9 illustrates an example computer system.

FIG. 9 illustrates an example computer system 200. As seen in FIG. 9, the computer system 200 includes a processor 902, a memory 904, a display 906, an interface 908, and an input 910, which may be configured to perform any of the contrast detection processes described herein. For example, the computer system 200 or its components may receive the image 100, generate the gradient mask 216, the blur mask 306, the saliency mask 402, and the filter mask 404. The components may determine relevant and irrelevant bounding boxes 502 for objects within the image 100 and apply the filter mask 404 to determine whether a safe region 702 overlaps with any relevant bounding boxes 502. Moreover, the components may generate the alert 704 and make automatic adjustments to the image 100 so that the overlaid object does not overlap any relevant bounding boxes 502.

The processor 902 is any electronic circuitry, including, but not limited to microprocessors, application specific integrated circuits (ASIC), application specific instruction set processor (ASIP), or state machines, that communicatively couples to memory 904 and controls the operation of the computer system 200. The processor 902 may be 8-bit, 16-bit, 32-bit, 64-bit or of any other suitable architecture. The processor 902 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 902 may include other hardware that operates software to control and process information. The processor 902 executes software stored on memory to perform any of the functions described herein. The processor 902 controls the operation and administration of the computer system 200 by processing information (e.g., information received from the memory 904, the interface 908, and the input 910). The processor 902 may be a programmable logic device, a microcontroller, a microprocessor, any suitable processing device, or any suitable combination of the preceding. The processor 902 is not limited to a single processing device and may encompass multiple processing devices.

The memory 904 may store, either permanently or temporarily, data, operational software, or other information for the processor 902. The memory 904 may include any one or a combination of volatile or non-volatile local or remote devices suitable for storing information. For example, the memory 904 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 904, a disk, a CD, or a flash drive. In particular embodiments, the software may include an application executable by the processor 902 to perform one or more of the functions described herein.

The display 906 may present visible output to a user of computer system 200. The display 906 may receive signals from the processor 902 and generate a visual image based on those signals. The display 906 may be any suitable display, such as a liquid crystal display, a cathode ray tube display, a light-emitting diodes display, or a plasma display. The display 906 may present visual information such as displaying the image 100. The display 106 may further display visual indicators of regions of low contrast.

The interface 908 may send communications from computer system 200 to other computer systems over a network. The interface 908 may also receive communications from other computer systems over the network. For example, the processor 902 may generate communications to be sent to other computer systems by the interface 908. The interface 908 may receive responses from the other computer systems and direct these responses to the processor 902. The interface 908 may include any suitable communication equipment, such as a network interface card, a modem, or a wireless radio.

The input 910 may include any suitable device operable by a user to generate signals for the computer system 200. The input 910 may include a keyboard, a mouse, a joystick, an optical device, a touchpad, a touchscreen, a mechanical button, a mechanical lever, a microphone, a camera, etc. The user may operate the input 910 to communicate signals or instructions to the computer system 200.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
producing a filter mask based on a blur mask and a saliency mask, wherein the blur mask is produced by measuring a difference between each pixel of a subset of pixels in a received image and a corresponding pixel of a blurred image produced by blurring the received image;
identifying locations of a plurality of bounding boxes of a plurality of objects of interest in the received image;
applying the filter mask to the received image and to the locations of the plurality of bounding boxes in the received image to remove at least one object of interest from consideration;
performing a comparison of a location of a bounding box of the plurality of bounding boxes of an object of interest remaining in consideration to a predetermined safe region of the received image; and
generating a validation result based on the comparison.

2. The method of claim 1, further comprising determining the subset of pixels based on a transparency level of a corresponding pixel in a transparency layer of the image.

3. The method of claim 1, further comprising:
determining a contrast value for each pixel in the subset of pixels; and
generating a gradient mask based on a variance of the contrast values of the subset of pixels, wherein the filter mask is produced further based on the gradient mask.

4. The method of claim 3, wherein the determined contrast value for a pixel in the subset of pixels is a maximum of contrast values determined by comparing a color of the pixel with the colors of pixels surrounding the pixel in the image.

5. The method of claim 3, further comprising de-noising the determined contrast values for the subset of pixels before generating the gradient mask based on the variance of the contrast values.

6. The method of claim 1, wherein the saliency mask is determined using a deep neural network and based on a subset of pixels of the received image.

7. The method of claim 1, wherein the saliency mask indicates a region of the image that is predicted to hold human attention for a threshold period of time.

8. An apparatus comprising:
a memory; and
a hardware processor communicatively coupled to the memory, the hardware processor configured to:
blur a subset of pixels of a received image to produce a blurred image;
measure a difference between each pixel of the subset of pixels in the received image and a corresponding pixel of the blurred image to produce a blur mask;
determine, using a deep neural network, a saliency mask of the subset of pixels;
produce a filter mask based on the blur mask and the saliency mask;
identify a boundary of a first object in the image;
apply the filter mask to the boundary for the first object to determine that the first object should not be obscured; and
generate an alert if a second object overlaps a portion of the boundary.

9. The apparatus of claim 8, wherein generating the validation result based on the comparison comprises:
determining an overlap in locations of pixels contained within the bounding box and a location of the predetermined safe region of the received image; and
generating an alert based on the determining of the overlap.

10. The apparatus of claim 8, wherein generating the validation result based on the comparison comprises:
determining an overlap in locations of pixels contained within the bounding box and a location of the predetermined safe region of the received image; and
adjusting a portion of the received image based on the overlap.

11. The apparatus of claim 10, wherein adjusting the portion of the received image comprises altering the location of the predetermined safe region.

12. The apparatus of claim 8, wherein the blur mask is produced by:
blurring a subset of pixels of a received image to produce a blurred image; and
measuring a difference between each pixel of the subset of pixels in the received image and a corresponding pixel of the blurred image.

13. The apparatus of claim 12, the hardware processor further configured to determine the subset of pixels based on a transparency level of a corresponding pixel in a transparency layer of the image.

14. The apparatus of claim 12, the hardware processor further configured to:
determine a contrast value for each pixel in the subset of pixels; and
generate a gradient mask based on a variance of the contrast values of the subset of pixels, wherein the filter mask is produced further based on the gradient mask.

15. The apparatus of claim 14, the hardware processor further configured to de-noise the determined contrast values for the subset of pixels before generating the gradient mask based on the variance of the contrast values.

16. The apparatus of claim 8, wherein the saliency mask is determined using a deep neural network and based on a subset of pixels of the received image.

17. A method comprising:
producing a filter mask based on a blur mask and a saliency mask;
identifying locations of a plurality of bounding boxes of a plurality of objects of interest in a received image;
applying the filter mask to the received image and to the locations of the plurality of bounding boxes in the received image to remove at least one object of interest from consideration;
performing a comparison of a location of a bounding box of the plurality of bounding boxes of an object of interest remaining in consideration to a predetermined safe region of the received image; and
generating a validation result based on the comparison, comprising determining an overlap in locations of pixels contained within the bounding box and a location of the predetermined safe region of the received image.

18. The method of claim 17, wherein generating the validation result based on the comparison further comprises:
generating an alert based on the determining of the overlap.

19. The method of claim 17, wherein generating the validation result based on the comparison further comprises:
adjusting a portion of the received image based on the overlap.

20. The method of claim 19, wherein adjusting the portion of the received image comprises altering the location of the predetermined safe region.

* * * * *